(12) United States Patent
Creel, Jr. et al.

(10) Patent No.: US 7,431,776 B2
(45) Date of Patent: Oct. 7, 2008

(54) SLAG-REMOVAL SYSTEM AND METHOD IN A CUTTING TABLE

(75) Inventors: James O'Neal Creel, Jr., Hemingway, SC (US); Rufus Randolph Brown, II, Florence, SC (US)

(73) Assignee: The Esab Group, Inc., Florence, SC (US)

( * ) Notice: Subject to any disclaimer, the term of this patent is extended or adjusted under 35 U.S.C. 154(b) by 400 days.

(21) Appl. No.: 11/378,153

(22) Filed: Mar. 17, 2006

(65) Prior Publication Data

US 2007/0215250 A1   Sep. 20, 2007

(51) Int. Cl.
*B23K 7/10* (2006.01)
(52) U.S. Cl. .......................................... 148/194; 266/49
(58) Field of Classification Search ................... 266/48, 266/49; 148/194
See application file for complete search history.

(56) References Cited

U.S. PATENT DOCUMENTS

| | | | |
|---|---|---|---|
| 3,666,249 A | 5/1972 | MacLeod, Jr. | |
| 3,999,744 A | 12/1976 | Kotch | |
| 6,039,915 A | 3/2000 | Minter et al. | |
| 6,165,410 A | 12/2000 | Crees et al. | |
| 7,011,789 B1 * | 3/2006 | Bowlin et al. | 266/49 |
| 2007/0215250 A1 * | 9/2007 | Creel et al. | 148/194 |

* cited by examiner

*Primary Examiner*—Scott Kastler
(74) *Attorney, Agent, or Firm*—Alston & Bird LLP (57) ABSTRACT

A slag-removal system for a cutting table includes a pair of drive members arranged in spaced endless loops extending parallel to a longitudinal direction, with a slag plow connected between the drive members, each loop having a lower run and an upper run spaced above the lower run. The slag plow is carried along the lower runs as the drive members are rotated, such that the plow scrapes slag from the support surface beneath the table. As the drive members continue to rotate in the same direction, the plow is carried along the upper runs of the drive members back to its starting location for another slag-removal cycle.

20 Claims, 7 Drawing Sheets

SLAG-REMOVAL SYSTEM AND METHOD IN A CUTTING TABLE

BACKGROUND OF THE INVENTION

The present invention relates to cutting tables for supporting metal workpieces to be cut by a torch or the like.

Cutting tables are frequently used for performing cutting operations on metal workpieces using a cutting device such as a gas torch, laser, or the like. A cutting table generally includes a table that supports the workpiece, and a cutting device that is moved by a suitable drive system to guide the cutting device along predetermined paths as the cutting device is operated to cut the workpiece. The drive system can be computer-controlled for guiding the cutting device's movement. The table includes openings through which molten slag formed during the cutting process falls into a space below the table. The table usually includes a duct system below the table for drawing away smoke and fumes created during the cutting process. Accordingly, such cutting tables are often referred to as "downdraft cutting tables" or the like.

The molten slag tends to build up below the table, and must be removed in order to keep the table in proper operating condition. Various slag-removal systems have been developed or proposed for removing slag from beneath cutting tables either continuously or periodically. Many slag-removable systems employ some type of scraper or plow that is scraped along the floor beneath the table for scraping off the slag that has fallen onto the floor. The slag is pushed to a location from which the slag can be collected and disposed of. The plow typically must then be reversed in direction to move it back to its starting point in preparation for another slag-removal cycle. The drive system for moving the plow thus requires limit switches or the like for detecting when the plow has reached the end of one slag-removal pass, and for detecting when the plow has reached the starting point during the reverse movement. Additionally, the motor of the drive system must be reversible (or a reversing gear arrangement must be employed) in order to move the plow back to the starting point.

As an alternative to a periodic type of slag-removal system as described above, a continuously operable conveyor can be disposed below the table for catching the slag as it falls through the table and for carrying the slag away to a location from which the slag can be collected and disposed of. However, a drawback of such a continuous conveyor system is that the conveyor can be damaged by the molten or hot slag when it falls onto the conveyor.

The duct system of existing downdraft cutting tables generally includes one or more ducts that extend longitudinally (i.e., parallel to the direction along which the slag plow moves) beneath the table. Each duct may include openings that are spaced apart along the longitudinal direction, and each opening may include a damper or door that is movable between open and closed positions. The opening and closing of the doors in some cases is dependent on the movement of the slag-removal device beneath the table.

BRIEF SUMMARY OF THE INVENTION

The present invention addresses the above needs and achieves other advantages. In one aspect of the invention, a cutting table is provided with a slag-removal system that periodically removes slag from beneath the table but does not require limit switches or a reversing system for reversing a slag plow.

In accordance with one embodiment of the invention, a cutting table comprises a table for supporting a workpiece to be cut, the table defining openings through which slag from a cutting operation falls into a space below the table. A frame supports the table in an elevated position above a support surface on which the cutting table is supported and on which the slag falls. The cutting table includes a slag-removal system disposed below the table for periodically removing slag from the support surface, the slag-removal system comprising a first drive member arranged in an endless loop that extends along a longitudinal direction beneath the table, and a second drive member arranged in an endless loop that extends in the longitudinal direction beneath the table, the second drive member being spaced in a transverse direction from the first drive member, each loop having a lower run and an upper run. The slag-removal system further comprises a slag plow extending in the transverse direction and having a first end connected to the first drive member and a second end connected to the second drive member. The first and second drive members are driven in a first rotational direction to rotate along the respective endless loops, such that the slag plow is carried along the lower runs of the drive members from a starting location to an ending location and scrapes slag from the support surface and pushes the slag to the ending location. As the drive members continue to rotate in the first rotational direction the slag plow is carried along the upper runs of the drive members, spaced above the support surface, back to the starting location to be ready for another pass along the support surface. The drive members can be continuously rotated in the first rotational direction so that the slag plow periodically scrapes the slag from the support surface.

In one embodiment of the invention, the slag-removal system includes a second slag plow connected to the drive members and spaced from the first slag plow such that while one of the slag plows is being carried along the support surface to scrape slag to the ending location, the other slag plow is being carried along the upper runs of the drive members back to the starting location.

In another embodiment of the invention, the cutting table includes one or more additional slag-removal systems disposed beneath the table, the slag-removal systems being spaced apart in the transverse direction. Thus, the cutting table can comprise a plurality of different cutting zones or "alleys" extending parallel to the longitudinal direction, each alley having its own slag-removal system. In accordance with one embodiment of the invention, the slag-removal systems are arranged in one or more pairs, the two adjacent systems of each pair being driven by a common drive motor. Advantageously, each of the first and second drive members comprises a chain, the endless loop of which travels about a drive sprocket that engages the chain, the drive sprockets for the first and second drive members being driven by the drive motor. The drive sprockets of one slag-removal system are coupled to those of the adjacent slag-removal system for being driven by the common drive motor.

In one embodiment, the or each slag-removal system further comprises a first slag shield disposed above the first drive member and a second slag shield disposed above the second drive member for shielding the drive members from slag falling through the table.

In one embodiment of the invention, the cutting table includes a downdraft duct disposed beneath the table for carrying away smoke and fumes generated in the cutting operation. The downdraft duct extends in the longitudinal direction and has a plurality of movable doors in a wall of the downdraft duct, the doors being spaced apart in the longitudinal direction. The doors are respectively coupled with independently operable actuators for opening and closing the doors independently of each other and independently of the movement of the slag plow. The opening and closing of the doors can be performed in dependence on an aspect of the cutting process, such as the positioning of the cutting device.

In a method aspect of the invention, a method for operating a cutting table having the slag-removal system as described above comprises steps of driving the first and second drive members in a first rotational direction to rotate along the respective endless loops, in such a manner that the slag plow is carried along the lower runs of the drive members from a starting location to an ending location such that the slag plow scrapes slag from the support surface and pushes the slag to the ending location, and continuing to drive the drive members in the first rotational direction so as to carry the slag plow along the upper runs of the drive members, spaced above the support surface, back to the starting location to be ready for another pass along the support surface.

The method can comprise the further steps of providing a downdraft duct disposed beneath the table for carrying away smoke and fumes generated in the cutting process, and providing a plurality of movable doors in a wall of the downdraft duct, the doors being spaced apart in the longitudinal direction, each of the doors being coupled with an independently operable actuator for opening and closing the door independently of the other doors such that smoke and fumes flow into the downdraft duct when the door is opened. The method can include activating the actuators to open and close the doors in dependence on the cutting process being performed on the workpiece and independently of the movement of the slag plow.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
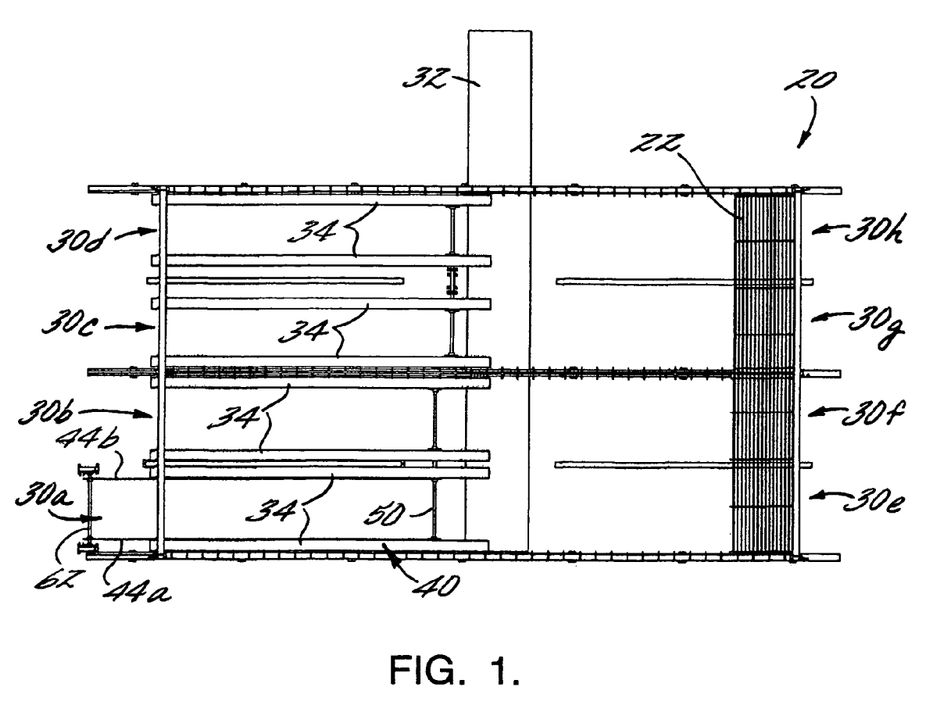
FIG. 1 is a top elevation of a cutting table in accordance with one embodiment of the invention.

A cutting table 20 in accordance with one embodiment of the invention, and various portions thereof, are depicted in FIGS. 1 through 11. The cutting table comprises a table 22 (only a portion of which is shown in FIG. 1) supported above a support surface S by a frame 24 that includes a plurality of vertical support posts 26 and 28. As shown in FIG. 1, the table in the illustrated embodiment comprises eight "alleys" 30a, 30b, 30c, 30d, 30e, 30f, 30g, and 30h that extend parallel to a longitudinal direction and are spaced apart in a transverse direction perpendicular to the longitudinal direction. The four alleys 30a-d are grouped together on one side of a transversely extending main downdraft duct 32, and the other four alleys 30e-h are grouped together on the other side of the main downdraft duct and are generally longitudinally aligned with the first four alleys. Alternatively, the main downdraft duct could be at one end of the table, and all of the alleys could be arranged on one side of the duct. The various alleys can all have the same transverse widths or can vary in width, and can have the same longitudinal lengths or can vary in length. Each alley is flanked by a pair of longitudinally extending downdraft ducts 34 that connect with the main downdraft duct 32. The support posts 26 are arranged in longitudinally extending rows and are spaced apart in the longitudinal direction, and the support posts 28 are likewise spaced apart in the longitudinal direction and arranged in rows that alternate with the rows of the posts 26. Each row of posts 26 supports a longitudinal support beam 36 atop the posts. The table 22 is supported by the support beams 36 and the support posts 28.

The table 22 is provided for supporting one or more workpieces (typically metal sheet or plate) on which cutting operations are to be performed. The cutting operations can be performed by various types of cutting devices (not shown) including plasma arc torches, gas torches, lasers, or the like. The cutting device is moved by a traversing mechanism, and is guided along predetermined cutting paths by a suitable control system, such as a CNC controller or the like. The cutting operation creates slag as the metal of the workpieces is rendered molten by the cutting device. The table 22 has openings (as shown in FIG. 1) through which the slag falls onto the supporting surface S below. For example, the table 22 can comprise a grid or screen type of structure having a plurality of transversely extending members that are spaced apart in the longitudinal direction and that are joined to a plurality of transversely spaced, longitudinally extending members. The particular structure of the table is not pertinent to the present invention, and various table structures can be used, as long as they allow slag to fall to the support surface S.

The cutting table 20 includes a slag-removal system 40 in each of the alleys 30a-h for periodically removing slag from the support surface S in each alley. FIGS. 3 through 10 illustrate one slag-removal system 40 and various components thereof. The slag-removal system 40 comprises a slag plow 42 that extends transversely across the respective alley 30. The slag plow is moved in the longitudinal direction so as to scrape along the support surface S, thereby scraping slag from the surface and pushing the slag to one end of the alley. For example, in the table as shown in FIG. 1, the slag-removal systems for the alleys 30a-d move the slag plows from right to left so as to push slag to the left-hand ends of the alleys, and the slag plows in the alleys 30e-h move left to right so as to push slag to the right-hand ends of the alleys. The slag can be pushed into receptacles (not shown) from which the slag can be periodically removed or continuously conveyed, if desired.

The slag plow 42 is moved by a drive system comprising a pair of drive members 44a, 44b each comprising an endless loop. Each drive member can comprise a metal chain, for example, made up of a series of metal chain links connected together and structured to mesh with a pair of toothed sprockets 46, 48 (FIG. 4) about which the chain is looped. The endless loops of the drive members 44a, 44b extend parallel to the longitudinal direction along the respective alley, and the loops are spaced apart in the transverse direction. Each loop lies in a vertical plane and has a lower run and an upper run spaced above the lower run. The slag plow 42 has one end connected by a link to the drive member 44a, and an opposite end connected by a link to the other drive member 44b. Thus, the slag plow 42 extends between the drive members 44a, 44b, across the width of the respective alley of the cutting table. The sprockets 46 for the drive members 44a, 44b are attached to a drive shaft 50 rotatably supported by bearings 52 (e.g., pillow block bearings or the like) that are mounted in mounting frames 54 fixedly mounted at an upstream end of the respective alley (wherein "upstream" refers to the direction opposite to the direction of movement of the slag plow 42; "downstream" refers to the direction of movement of the slag plow).

Figure 8:
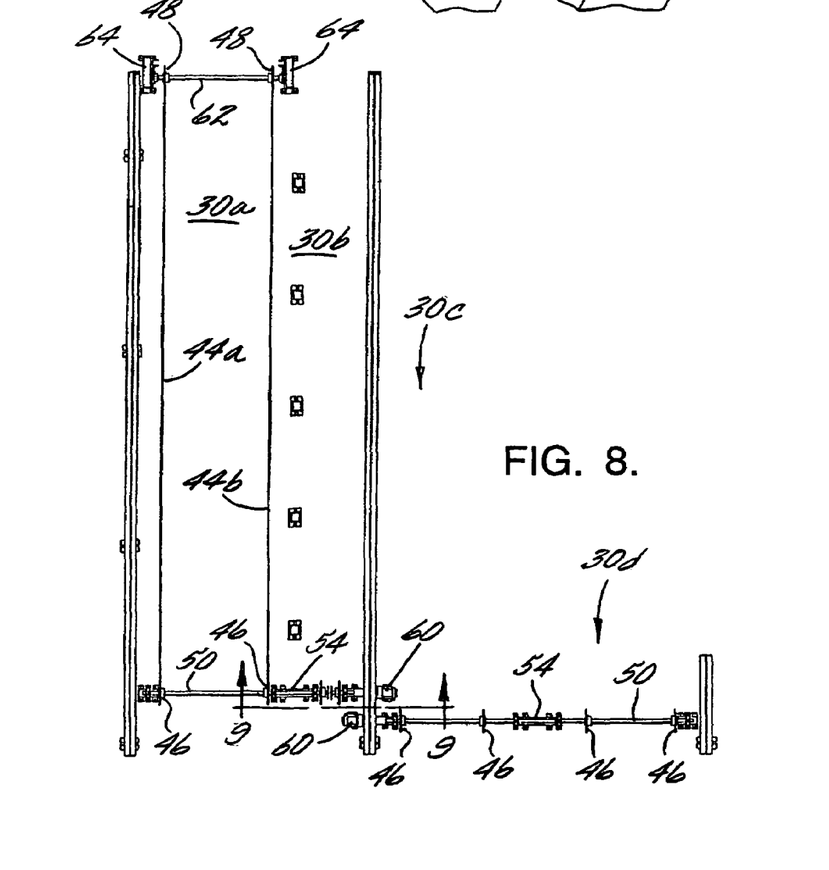
FIG. 8 is a top elevation showing portions of the slag-removal systems of several adjacent alleys of the cutting table in accordance with one embodiment of the invention.
Figure 9:
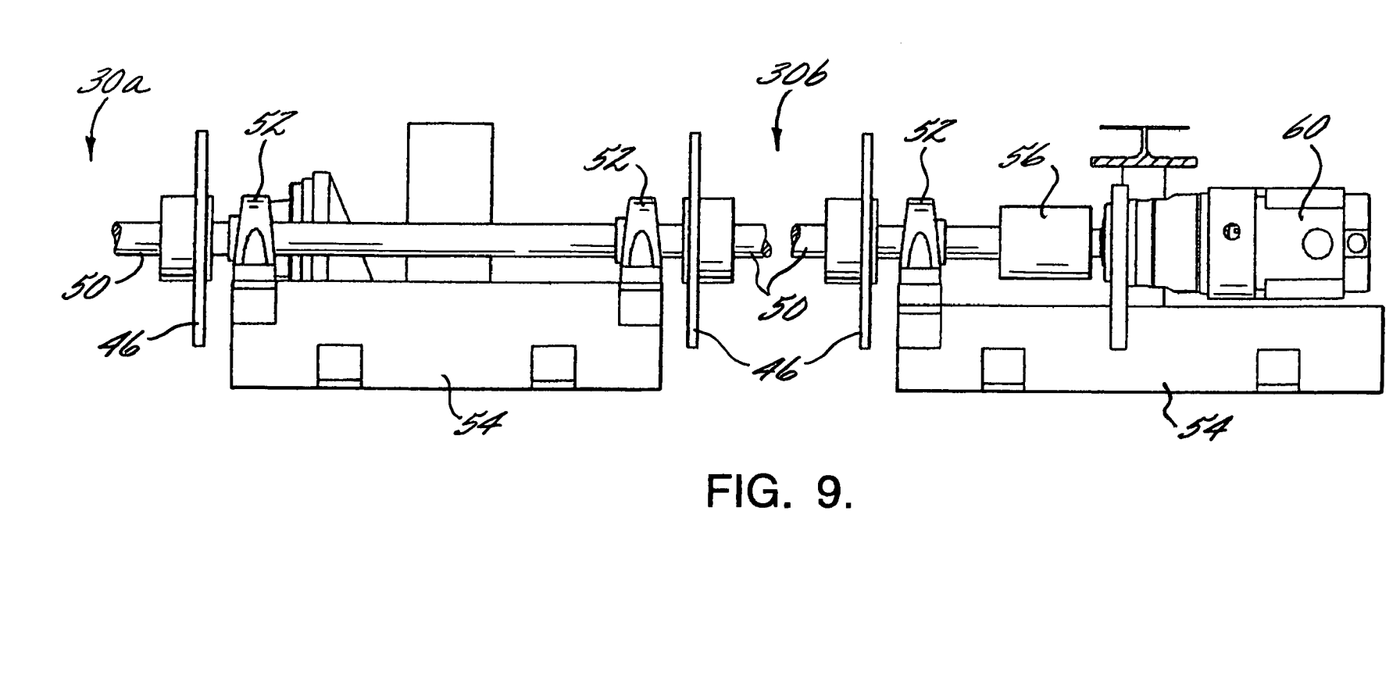
FIG. 9 is a view along line 9-9 in FIG. 8.
Figure 10:
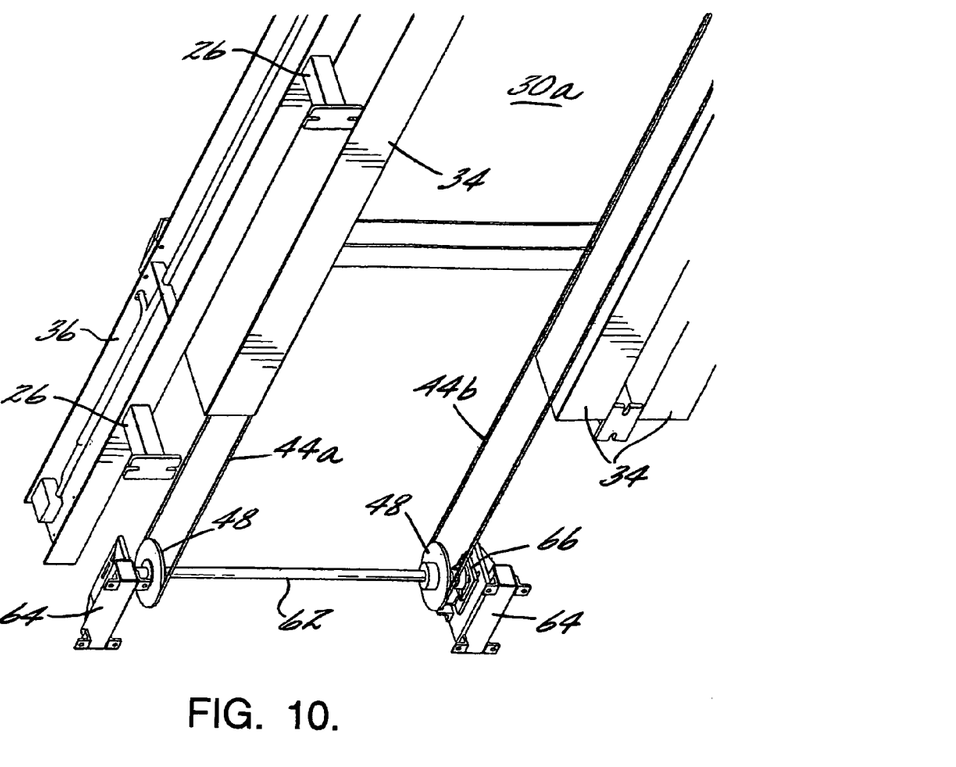
FIG. 10 is a magnified view of a portion of FIG. 5.

The alleys 30a-d are arranged in two pairs of adjacent alleys 30a-b and 30c-d. The slag-removal systems of the alleys 30a-b are driven by a common drive shaft 50 coupled to a motor 60. The slag-removal systems of the alleys 30c-d are driven by a second common drive shaft 50 coupled to a motor 60, as best seen in FIG. 8. The slag-removal systems and drive motor arrangement of the alleys 30a-b are now described in detail. The slag-removal systems and drive motor arrangements of the other pairs of alleys 30c-d, 30e-f, and 30g-h are similar and will not be described in detail. The motor 60 for the alleys 30a-b is coupled by a flexible coupling 56 to the drive shaft 50 supported in the bearings 52. The motor 60 and flexible coupling 56 and one bearing 52 are mounted in one mounting frame 54 fixedly mounted at a location between the alley 30b and the adjacent alley 30c. A second mounting frame 54 supporting an additional pair of bearings 52 is fixedly mounted at a location between an inner edge of the alley 30a and the adjacent alley 30b. A third mounting frame 54 (FIG. 6) supporting a bearing 52 is fixedly mounted at a location adjacent the outer edge of the alley 30a. The drive shaft 50 is supported in the various bearings 52 and is driven by the motor 60 to drive the drive members 44a, 44b of the two alleys 30a-b.

At the downstream ends of the alleys, the driven sprockets 48 of each alley are attached to a driven shaft 62. The opposite ends of the driven shaft are supported in bearings mounted in mounting frames 64 fixedly mounted adjacent the opposite edges of the respective alley. A chain tensioner 66 is also provided for adjusting the amount of tension in each of the drive members 44a, 44b.

The motor 60 for each pair of adjacent alleys drives the common drive shaft 50 for the two slag-removal systems 40, thereby driving the drive members 44a, 44b to move the slag plows 42 along the lower runs of the endless loops of the drive members, such that the slag plows scrape along the support surface S and push any slag to the downstream ends of the alleys, from where the slag can be removed.

Figure 4:
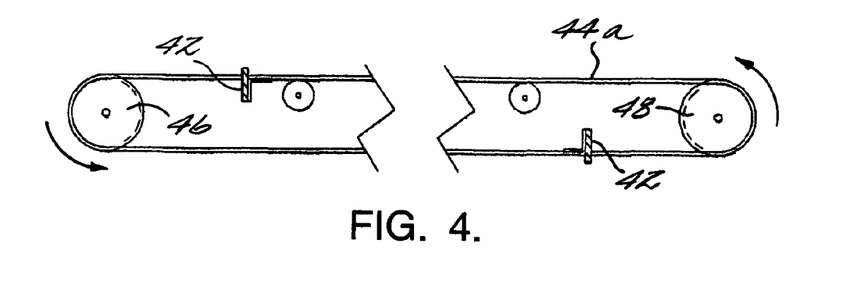
FIG. 4 is a cross-sectional view along line 4-4 in FIG. 2.

With reference to FIG. 4 in particular, as the motor continues to drive the drive members 44a, 44b in the same direction, after the slag plows 42 reach the downstream end of the lower runs of the drive members, the plows are then carried along the upper runs of the drive members in the upstream direction, back to the upstream ends of the alleys for another slag-removal cycle. As shown, the slag-removal system advantageously can include two slag plows attached to the drive members 44a, 44b and spaced apart such that while one plow is scraping slag from the support surface, the other plow is being carried back to the upstream end for another slag-removal cycle. In this manner, the two plows can alternately scrape slag as the drive members are continuously rotated in one direction. It will be appreciated that the unidirectional slag-removal system in accordance with the invention does not require limit switches for sensing when a slag plow has reached the end of a slag-removal cycle, nor does it require a reversible motor or reversing gear arrangement for reversing the direction of movement of the plow.

The drive motors 60 can be operated intermittently or continuously. As one example, the motor for a particular alley or group of alleys can be operated to carry out one or more slag-removal cycles, after which the motor can be stopped such that the plows 42 are parked at the upstream and downstream ends of the alleys, out of the way of the cutting operation. After a period of cutting operations with the plows parked, the motor can be turned on to perform one or more slag-removal cycles and then stopped to park the plows again, and so forth. Alternatively, the motor can be operated continuously, if desired.

Figure 2:
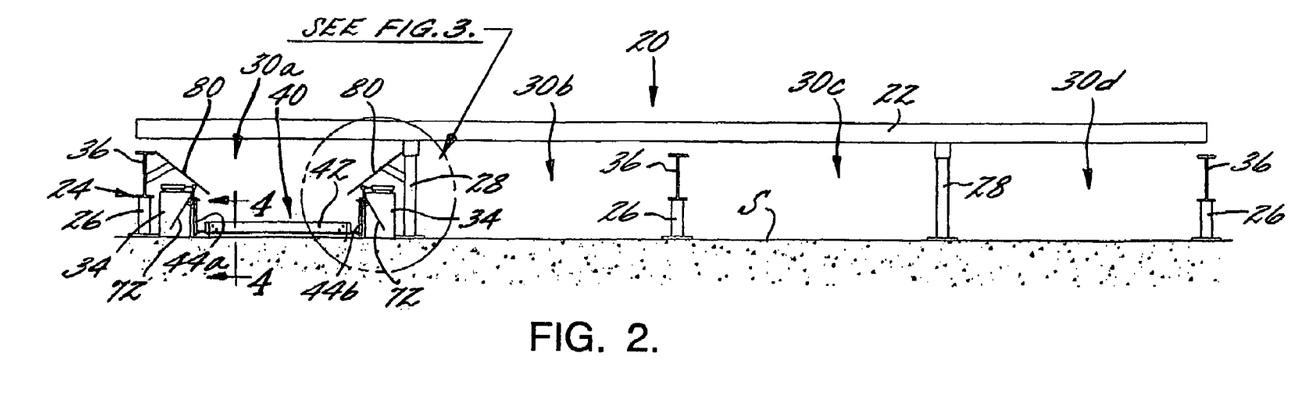
FIG. 2 is an end elevation of the cutting table, showing details of the slag-removal system in one of the "alleys" of the table.
Figure 3:
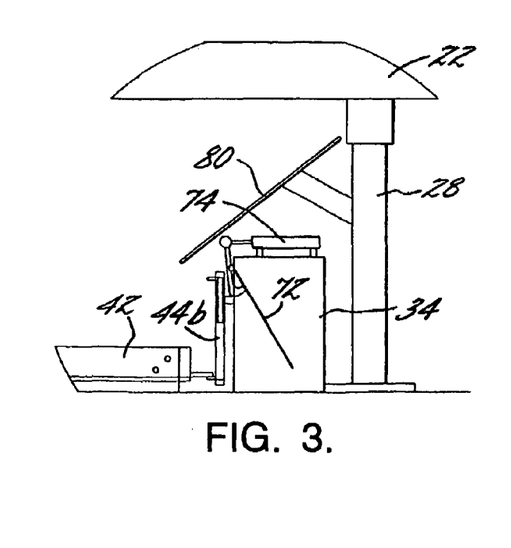
FIG. 3 is a magnified view of a portion of FIG. 2.
Figure 5:
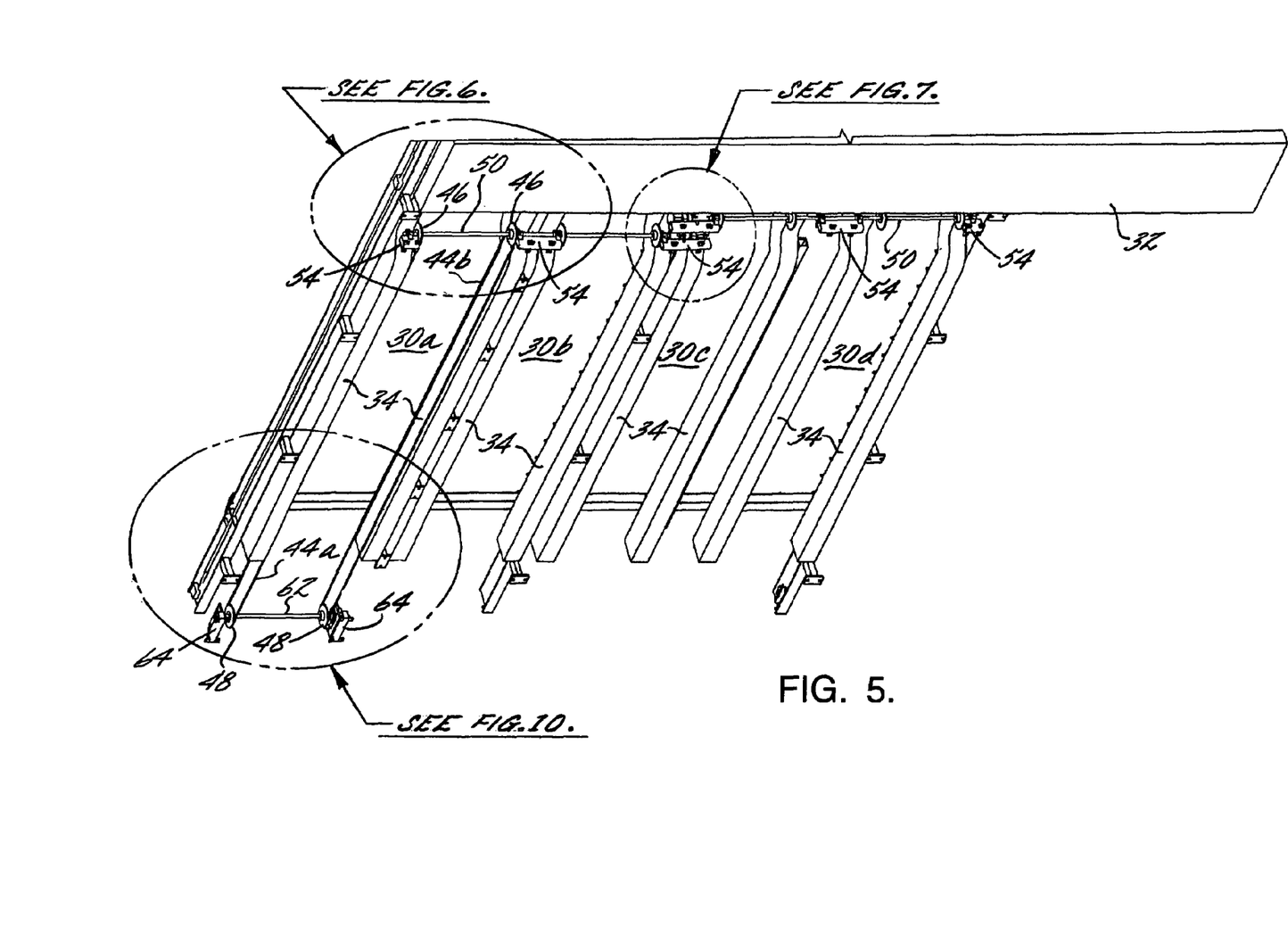
FIG. 5 is an isometric view, generally from the bottom looking upward, of a portion of the cutting table.
Figure 6:
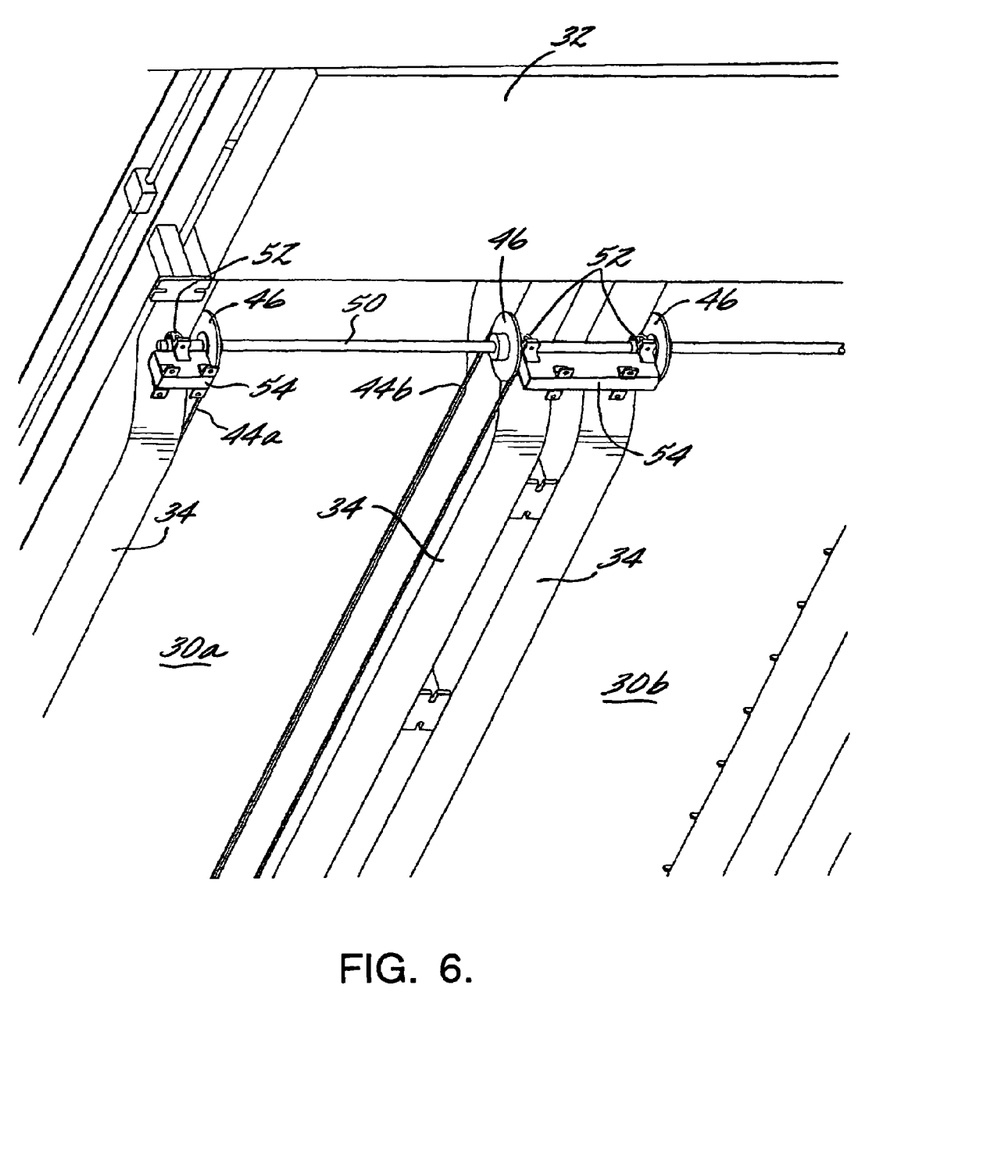
FIG. 6 is a magnified view of a portion of FIG. 5.
Figure 7:
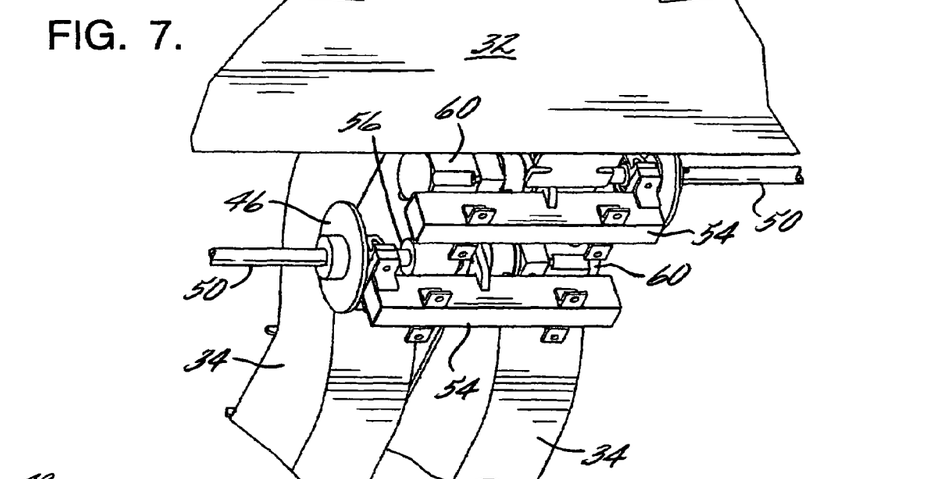
FIG. 7 is a magnified view of another portion of FIG. 5.
Figure 11:
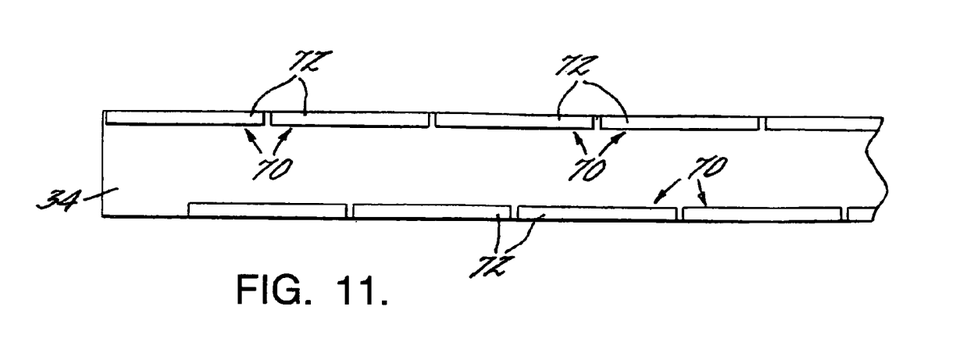
FIG. 11 is a schematic top elevation of a pair of downdraft ducts in accordance with one embodiment of the invention, showing the longitudinally spaced doors.

As noted, the cutting table 20 includes longitudinal downdraft ducts 34 for drawing away smoke and fumes generated during a cutting operation. In the illustrated embodiment, as best seen in FIGS. 2 and 5, each alley 30a-h is flanked on its longitudinal edges by two of the ducts 34. With particular reference to FIGS. 3 and 11, each duct includes a plurality of openings 70 that are spaced apart in the longitudinal direction along the length of the duct. Each opening is selectively opened or closed by a movable door 72. Each door is opened and closed by an actuator 74 such as a pneumatic cylinder or the like. The actuators 74 are controlled by a suitable controller such as the CNC controller that controls the cutting device. Accordingly, the doors 72 can be opened and closed independently of one another and independently of the movement or position of the slag plow 42. As one example, the actuators 74 can be controlled to open and close the doors 72 in dependence on the cutting operation being performed. For instance, the doors in vicinity of the cutting device can be opened while the other doors are kept closed, and as the cutting device moves to another location, the previously opened doors can be closed and the previously closed doors beneath the new location of the cutting device can be opened. If desired, as the cutting device moves toward a new location, the door(s) beneath the new location can be opened in advance of the cutting device reaching the new location. Furthermore, the controller can determine the door or doors that is/are nearest the cutting device in both the longitudinal and transverse directions, and can actuate the corresponding actuator(s) 74 to open such nearest door(s).

As shown in FIGS. 2 and 3, the cutting table also includes shields 80 disposed above the drive members 44a, 44b and the doors 72 and actuators 74 for protecting these components from falling slag. The shield can comprise sheet metal (e.g., stainless steel) members. The shields can be affixed to suitable parts of the machine, such as the support posts 28 and support beams 36 as shown.

The slag plow 42 can have various constructions and can be made of various materials. For example, the plow can be formed of hardened steel or other suitably strong material. The plow can include a removable and replaceable wear surface (not shown) that attaches to the plow to form the surface that is contacted by the slag. The wear surface can comprise a polymer-based material such as polyamide (e.g., NYLON®). One suitable material by way of example only is NYLATRON® cast or extruded polyamide-based material available in various grades and types from Quadrant Engineering Plastic Products, Inc.

Many modifications and other embodiments of the inventions set forth herein will come to mind to one skilled in the art to which these inventions pertain having the benefit of the teachings presented in the foregoing descriptions and the associated drawings. For example, each slag-removal system could have its own dedicated drive motor; three or more slag-removal systems could be driven by a common drive motor; Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cutting table for supporting a metal workpiece to be subjected to a cutting operation that creates slag, the cutting table comprising:
   a table for supporting a workpiece to be cut, the table defining openings through which slag from a cutting operation falls into a space below the table;
   a frame supporting the table in an elevated position above a support surface on which the cutting table is supported and on which the slag falls; and
   a slag-removal system disposed below the table for periodically removing slag from the support surface, the slag-removal system comprising:
      a first drive member arranged in an endless loop that extends along a longitudinal direction beneath the table;
      a second drive member arranged in an endless loop that extends in the longitudinal direction beneath the table, the second drive member being spaced in a transverse direction from the first drive member, each loop having a lower run and an upper run spaced above the lower run;
      a slag plow extending in the transverse direction and having a first end connected to the first drive member and a second end connected to the second drive member;
      the first and second drive members being driven in a first rotational direction to rotate along the respective endless loops, such that the slag plow is carried along the lower runs of the drive members from a starting location to an ending location and scrapes slag from the support surface and pushes the slag to the ending location, and as the drive members continue to rotate in the first rotational direction the slag plow is carried along the upper runs of the drive members, spaced above the support surface, back to the starting location to be ready for another pass along the support surface.

2. The cutting table of claim 1, wherein the slag-removal system further comprises:
   a drive motor in driving connection with the first and second drive members, the drive motor being operable to drive the drive members in the first rotational direction.

3. The cutting table of claim 2, wherein each of the first and second drive members comprises a chain, the endless loop of which travels about a drive sprocket that engages the chain, the drive sprockets for the first and second drive members being driven by the drive motor.

4. The cutting table of claim 3, further comprising a second said slag-removal system disposed beneath the table, the two slag-removal systems being spaced apart in the transverse direction and adjacently located with respect to each other.

5. The cutting table of claim 4, wherein the two slag-removal systems are both driven by the drive motor.

6. The cutting table of claim 1, wherein the slag-removal system further comprises a second slag plow connected to the first and second drive members, the two slag plows being spaced apart in the longitudinal direction such that while one of the slag plows is being carried along the support surface to scrape slag to the ending location, the other slag plow is being carried along the upper runs of the drive members back to the starting location.

7. The cutting table of claim 1, wherein the slag-removal system further comprises a first slag shield disposed above the first drive member and a second slag shield disposed above the second drive member for shielding the drive members from slag falling through the table.

8. The cutting table of claim 1, further comprising a downdraft duct disposed beneath the table for carrying away smoke and fumes generated in the cutting operation.

9. The cutting table of claim 8, wherein the downdraft duct extends in the longitudinal direction and has a plurality of movable doors in a wall of the downdraft duct, the doors being spaced apart in the longitudinal direction, the doors being respectively coupled with independently operable actuators for opening and closing the doors independently of each other and independently of the movement of the slag plow.

10. The cutting table of claim 9, further comprising a second said downdraft duct having said movable doors, the downdraft ducts being spaced apart in the transverse direction.

11. The cutting table of claim 10, wherein the slag-removal system is disposed between the two downdraft ducts.

12. The cutting table of claim 11, wherein the first drive member is mounted adjacent one of the downdraft ducts and the second drive member is mounted adjacent the other downdraft duct.

13. The cutting table of claim 1, wherein the cutting table comprises a plurality of longitudinally extending sections arranged side-by-side, each section having one said slag-removal system.

14. The cutting table of claim 13, wherein there are at least four sections arranged in at least two pairs of adjacent sections, and wherein the two slag-removal systems for each pair of adjacent sections are coupled to a drive motor that drives said two slag-removal systems independently of the drive motor(s) for the other pair(s) of sections.

15. The cutting table of claim 14, further comprising a longitudinally extending downdraft duct disposed between the adjacent sections of each pair.

16. The cutting table of claim 14, wherein each of the drive members of each slag-removal system comprises a chain looped about a first sprocket proximate the starting location and about a second sprocket proximate the ending location, the first sprockets of the adjacent sections of each pair being connected by a transversely extending first shaft, the second sprockets of the adjacent sections of each pair being connected by a transversely extending second shaft, one of the first and second shafts for each pair comprising a drive shaft coupled to the drive motor.

17. The cutting table of claim 16, wherein two drive motors for two pairs of adjacent sections are mounted proximate to each other, with the drive shaft for one of the drive motors extending transversely away from the drive motor in a first direction and the drive shaft for the other drive motor extending transversely away from the drive motor in a second direction opposite to the first direction.

18. The cutting table of claim 14, wherein each slag-removal system further comprises a second slag plow connected to the first and second drive members, the two slag plows being spaced apart in the longitudinal direction such that while one of the slag plows is being carried along the support surface to scrape slag to the ending location, the other slag plow is being carried along the upper runs of the drive members back to the starting location.

19. A method for operating a cutting table supporting a metal workpiece to be subjected to a cutting operation that creates slag, the cutting table comprising a table for supporting a workpiece to be cut, the table defining openings through which slag from a cutting process falls into a space below the table, a frame supporting the table in an elevated position above a support surface on which the cutting table is supported and on which the slag falls, and a slag-removal system disposed below the table for periodically removing slag from the support surface, the method comprising the steps of:

providing a first drive member arranged in an endless loop that extends along a longitudinal direction beneath the table;

providing a second drive member arranged in an endless loop that extends in the longitudinal direction beneath the table, the second drive member being spaced in a transverse direction from the first drive member, each loop having a lower run and an upper run spaced above the lower run;

providing a slag plow extending in the transverse direction and having a first end connected to the first drive member and a second end connected to the second drive member;

driving the first and second drive members in a first rotational direction to rotate along the respective endless loops, in such a manner that the slag plow is carried along the lower runs of the drive members from a starting location to an ending location such that the slag plow scrapes slag from the support surface and pushes the slag to the ending location; and     continuing to drive the drive members in the first rotational direction so as to carry the slag plow along the upper runs of the drive members, spaced above the support surface, back to the starting location to be ready for another pass along the support surface.

20. The method of claim 19, further comprising the steps of:

providing a downdraft duct disposed beneath the table for carrying away smoke and fumes generated in the cutting process;

providing a plurality of movable doors in a wall of the downdraft duct, the doors being spaced apart in the longitudinal direction, each of the doors being coupled with an independently operable actuator for opening and closing the door independently of the other doors such that smoke and fumes flow into the downdraft duct when the door is opened; and     activating the actuators to open and close the doors in dependence on the cutting operation being performed on the workpiece and independently of the movement of the slag plow.

\* \* \* \* \*